Sept. 7, 1965 R. COLLINS 3,204,790
BOAT LOADER ATTACHMENT FOR BOAT TRAILERS
Filed May 7, 1964 2 Sheets-Sheet 1
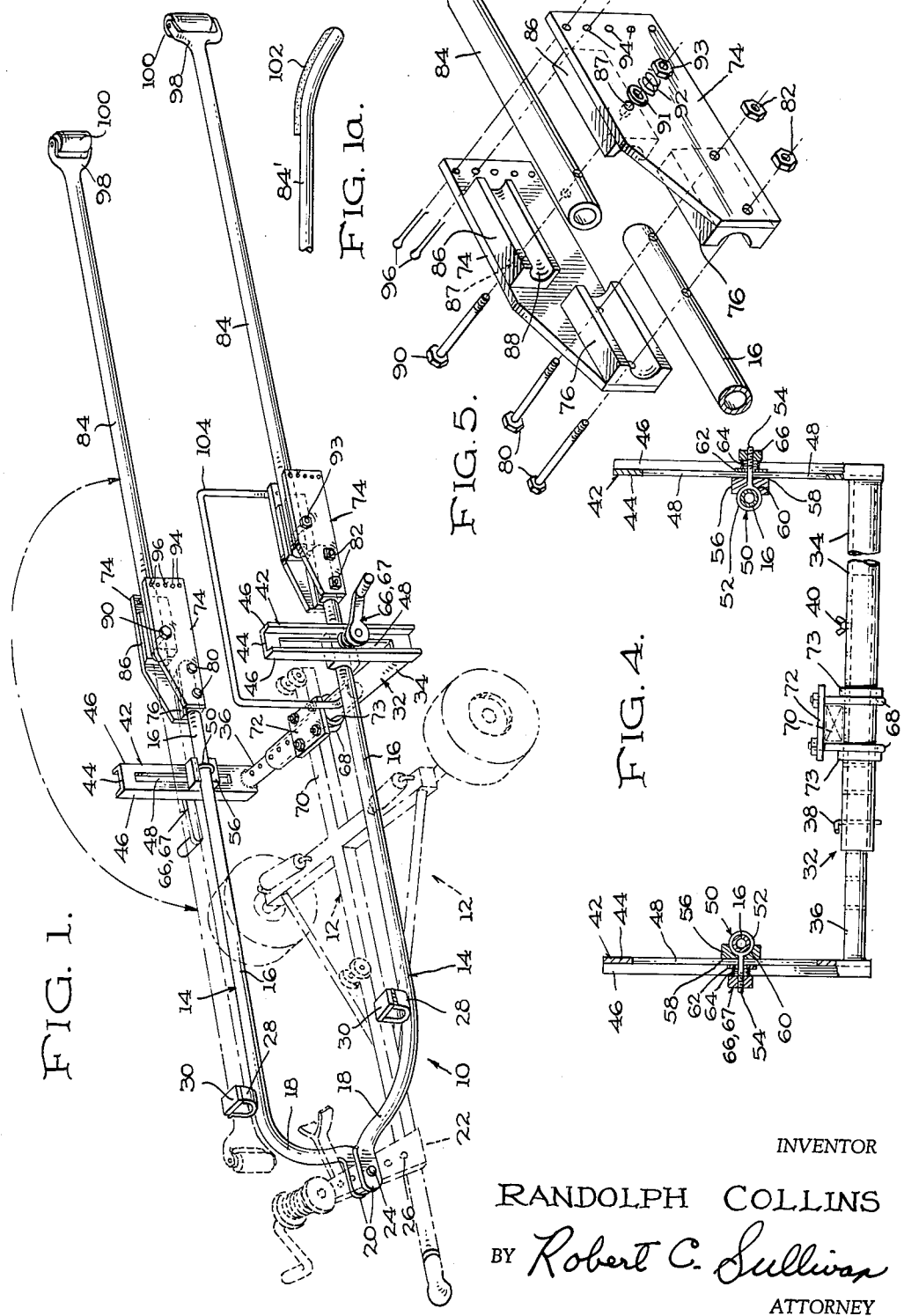
INVENTOR
RANDOLPH COLLINS
BY Robert C. Sullivan
ATTORNEY Sept. 7, 1965   R. COLLINS   3,204,790
BOAT LOADER ATTACHMENT FOR BOAT TRAILERS
Filed May 7, 1964   2 Sheets-Sheet 2
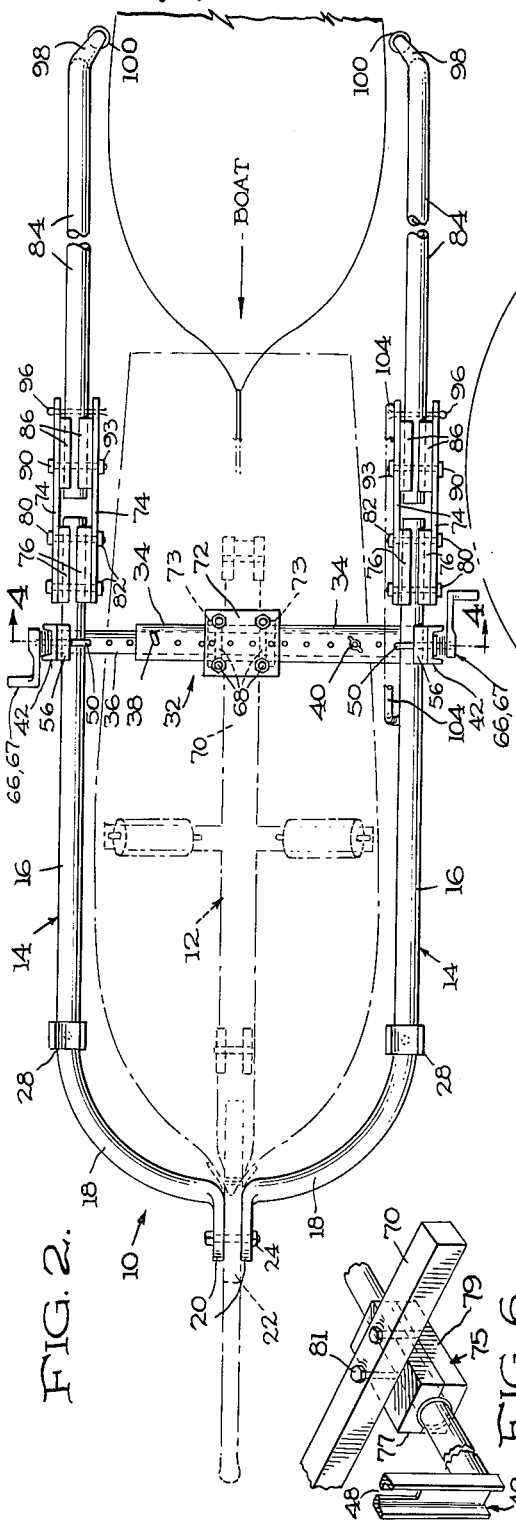
INVENTOR
RANDOLPH COLLINS
BY Robert C. Sullivan
ATTORNEY United States Patent Office 3,204,790
Patented Sept. 7, 1965

3,204,790
BOAT LOADER ATTACHMENT FOR BOAT TRAILERS
Randolph Collins, 1724 N. 31st St., Lincoln, Nebr.
Filed May 7, 1964, Ser. No. 365,608
10 Claims. (Cl. 214—84)

This invention relates to a boat loader attachment for boat trailers which may be attached to almost any type of boat trailer, including tilting trailers, and to the combination of such a boat loader attachment with a boat trailer.

It is an object of this invention to provide a boat loader attachment which may be easily secured to most types of boat trailers available on the market to facilitate the loading of boats onto the boat trailer.

It is a further object of the invention to provide a boat loader attachment for use with boat trailers which can be built and sold for a reasonable price and which permits the owner of a boat trailer not provided with loading guides to install the attachment onto his existing trailer, thereby avoiding the necessity of purchasing a new trailer with guides.

It is a further object of the invention to provide a boat loader attachment for mounting on boat trailers which permits one person to load a boat onto the trailer without help and without getting his feet wet.

It is a still further object of the invention to provide a loader attachment for boat trailers which holds the boat straight in any depth of water or hard wind until the person loading the boat is ready to load the boat onto the trailer.

It is another object of the invention to provide a boat loading attachment for boat trailers which can be made in different sizes to accommodate nearly all sizes of boats and in which each size can be adjusted for several different sizes of boats.

In achievement of these objectives, there is provided in accordance with this invention a boat loader attachment adapted to be mounted on almost any type of boat trailer not already provided with guide arms. The loader attachment comprises a pair of laterally spaced stationary guide arms which are secured at their forward ends to an upright on the trailer frame at an adjustable height on the trailer upright. The loader attachment also includes a back support sub-assembly comprising a pair of laterally spaced upright channels or the like which are mounted on a telescopically adjustable cross member which is secured to the rearward portion of the trailer frame. The height of the rearward portions of the stationary support arms may be slidably adjusted relative to the upright channels of the back support sub-assembly. The stationary arms are also mounted on the vertical channel members by a connection which permits a pivotal movement of the vertical channel members relative to stationary arms, as may be required when the boat loader attachment is mounted on a tilting type boat trailer. A pair of elongated movable guide arms are pivotally secured to the rearward ends of the stationary arms, the movable guide arms being swingable rearwardly about their pivotal support to guide the boat which is to be loaded. The movable guide arms may be swung forwardly about their pivotal support to a forwardly retracted position when not in use for guiding a boat.

Further objects and advantages of the invention will become apparent from the following description taken in conjunction with the accompanying drawings in which:

FIG. 1 is a perspective view of the boat loader attachment in accordance with the invention mounted on a boat trailer, with the guide members in extended guiding position;

FIG. 1(a) is a top plan view of a modified type of guide arm for use with the boat loader attachment;

FIG. 2 is a top plan view of the boat loader attachment of FIG. 1;

FIG. 3 is a side elevation view of the boat loader attachment mounted on a trailer;

FIG. 4 is a view in transverse section along line 4—4 of FIG. 2;

FIG. 5 is a perspective exploded view showing enlarged details of the mounting arrangement for the pivotally movable boat loader guide members; and FIG. 6 is a fragmentary perspective view showing the clamp bearing which supports the back support sub-assembly 32 in a modified construction particularly suitable for use with tilting trailers.

Referring now to the drawings, the boat loader attachment is generally indicated at 10 and is adapted to be mounted on a boat trailer generally indicated at 12. The boat trailer per se forms no part of this invention and may be practically any type of boat trailer now available on the market. The boat loader attachment comprises a pair of stationary arm members each respectively generally indicated at 14 which may be formed of steel pipe or the like. Each stationary arm 14 includes a straight portion 16 which extends in parallel laterally spaced relation to the opposite straight portion 16 in a direction lengthwise of the trailer axis. The forward ends of the stationary arms 14 are curved inwardly toward the central axis of the supporting trailer as indicate at 18 but are then bent forwardly and parallel to each other for a short distance as indicated at 20. The short parallel forward end portions 20 of the stationary support arms are fastened by a single bolt 24 to the winch-supporting upright 22 carried by the forward end of the trailer body, bolt 24 extending through a preselected one of the holes 26 in upright 22. Each of the stationary arms 14 is provided at the forward end of the straight portion 16 thereof with an upwardly open rest or support 28 of generally U-shaped configuration which serves to support the forward end of one of the pivotally movable folding arms 84, to be described, when the arm 84 is in its forwardly folded retracted position as will be explained later. A hinged cap 30 is connected to the upper edge of each of the U-shaped supports 28 and is adapted to be closed into overlying relation to the pivotally movable guide arm 84 to secure the arm 84 against upward movement when the arm 84 is in its forwardly folded out-of-use position.

Adjacent the rear portion of the boat loader attachment 10 is provided a back support sub-assembly generally indicated at 32 comprising a pair of pipe members or the like 34 and 36 which are telescopically engaged with each other, the pipe member 34 being of larger diameter and receiving in adjustable sliding relation thereto the inner pipe member 36 of smaller diameter. Both the pipe members 34 and 36 are provided with spaced holes therethrough and a bolt 38 is positioned through a pair of aligned holes of the outer and inner pipes 34 and 36 to hold the telescopically engaged pipes in a predetermined adjusted position with respect to each other.

The telescopic engagement of pipes 34 and 36 permits the lateral width of the back support sub-assembly 32 to be adjusted to correspond to different boat widths. Shims or spacers may be inserted between the forward ends 20 of arms 14 and the upright 22 carried by the trailer to permit a corresponding lateral width adjustment at the forward end of the boat trailer.

A set screw 40 is also used and passes through an aperture in the outer pipe 34 and into frictional engagement with an outer unapertured surface portion of the inner pipe 36 to prevent rattling or looseness of the two pipes 34 and 36 with respect to each other.

An upright channel member 42 is secured by welding to the outer end of each of the respective pipes 34 and 36, although the upright member may be formed by bending a channel member to right angle shape, which is suitably secured to the ends of the horizontal pipe members 34 and 36. Each channel member 42 includes a vertical web portion 44 and oppositely disposed laterally outwardly facing flange portions 46. The web portion 44 of each of the channel members 42 is provided with a vertical slot 48 which permits the vertical adjustment of the rearward end of the corresponding stationary arm 14, as will now be described.

Each stationary arm 14 is received in the eye portion 52 of an eye bolt generally indicated at 50, the eye portion 52 of the eye bolt being so dimensioned that the pipe-like arm 14 is slidably movable through the eye of the eye bolt. The eye bolt 50 also includes a stem portion 54 which passes through a plate 56 and thence through the slot 48 of channel 42. The plate member generally indicated at 56 includes a flat surface 58 which lies in abutting relation to the inwardly facing flat surface of the web 46 of upright channel 42. Each plate 56 is also provided with a concave surface 60 which is adapted to receive the curved surface of the eye 52 of eye bolt 50. The stem or shank 54 of the eye bolt passes through a passage in plate 56 and through the slot 48 of channel 42. A washer 62, a spring 64, and a crank wrench including a nut 66 having a crank handle 67 thereon is secured to the stem 54 of the eye bolt adjacent the outwardly facing surface of web 46 of channel member 42. A wing nut may be used in place of nut 66 and crank handle 67, if desired. The nut 66 is tightened onto the thread of the eye bolt to hold the rear end of each stationary arm 14 in a given adjusted position. Thus, it will be seen that the forward end of each stationary arm 14 is secured by bolt 24 in one of the apertures 26 of upright 22 at the forward end of the trailer body, and the rear end of each stationary arm 14 is secured as just described in the slot 48 of channel 42 by means of the crank nut 66–67, or alternatively, by means of a wing nut.

The structure just described by means of which the rear end of each arm 14 is secured by means of the plate 56 and eye bolt 50 to the slot 48 of upright channel member 42, and more particularly the engagement between the flat surface 58 of plate 56 and the abutting flat surface of the web 44 of upright channel 42 provides a smooth sliding joint to facilitate the vertical adjustment of each stationary arm 14, and also provides a pivotally movable joint between the channel member 42 and each stationary arm 14 when the boat loading attachment 10 is mounted on a tilting trailer, in which case there may be a relative pivoting movement between the upright channel 42 and the respective stationary arm 14.

The telescopically engaged pipe members 34 and 36 of the sub-assembly 32 may be fastened beneath the central longitudinal frame member 70 of the trailer by two U-bolts 68. The two U-bolts 68 are joined together by a cross piece 72 which lies above the central longitudinal frame member 70 of the trailer. In some cases, it may be possible to mount sub-assembly 32 above the trailer frame, but in general it is preferable to mount it below the trailer frame, as just described.

When the boat loading attachment 10 is mounted on a tilting type trailer, a clamp bearing or boxing such as that indicated at 75 in FIG. 6 is preferably used to mount the cross member 32 to the trailer frame rather than using the U-clamps 68 shown in FIG. 4. The clamp bearing or boxing comprises a pair of mating sections 77 and 79 which are secured to the longitudinal frame member 70 of the trailer by means of bolts 81. The mating sections 77 and 79 provide a bearing which permits a relative turning movement of the transverse back support assembly comprising telescoped pipes 34 and 36 relative to the trailer frame as may be required on the tilting action of the tilting trailer. If required, more than one pair of U-bolts 68 or more than one set of clamp bearings or boxings 75 may be used to secure the back support sub-assembly 32, including pipes 34 and 36, to the trailer frame. Collars 73 may surround the pipe 34 of the back support sub-assembly 32 and bear against the lateral ends of the clamp housing. The collars 73 are fastened to pipe 34 by set screws to permit adjustment of the lateral position of the collars when adjusting the lateral width of the boat loader attachment for different boat widths. The engagement of the collars 73, in any given adjusted position on pipe 34 with the abutting surfaces of the clamp bearings, prevents lateral shifting of the pipe assembly 34–36 relative to the trailer frame.

To the back end of each of the stationary arms 14 is secured a pair of laterally spaced plate members 74. Each plate member 74 has fixed to the inner surface thereof, and adjacent the forward end thereof, a plate 76 generally similar to the plate 56 previously described. Each plate 76 includes a flat surface in abutting relation to the inner flat surface of its corresponding plate member 74 and a concave surface adapted to receive substantially one half of the cylindrical surface of the back end of one of the stationary arms 14. A pair of bolts 80 extends through the plate 74, through the inner plates 76 and through passages in the back end of the corresponding stationary arm 14 to secure plates 74, 76, and arm 14 in assembled relation. Nuts 82 are secured to the outer ends of the respective bolts 80.

Movable guide arms generally indicated at 84 are pivotally movable from the extended position shown in FIG. 1 in full line to the retracted out-of-use forwardly folded position, shown in dotted lines in FIG. 1, about a pivotal connection with respect to the plates 74 as will now be described. To the rear or back end of each of the plates 74 and at a higher level than the level of the attachment of plates 76 hereinbefore described, are pivotally secured a pair of plate members 86 which are constructed similarly to the plate members 56 and 76 previously described. Each plate 86 includes a flat surface in engagement with a flat inner face of one of the plate members 74 and a concave surface 88 adapted to receive the forward end of one of the pivotally movable guide members 84. The two plate members 86 and the forward end of the corresponding movable guide members 84 are secured for pivotal movement between the opposite plates 74 by means of the pivot bolt 90 adapted to pass through passages in the plate 74 at 87 and through a passage in the forward end of each movable guide arm 84, whereby each guide arm 84 and the plates 86 which engage it are pivotably movable about the corresponding pivotal support 90. A washer 91, spring 92 and nut 93 are mounted on the threaded end of the bolt 90 to secure the bolt in position.

The guide arms 84 may be swung about their respective pivotal support 90 to any one of a plurality of adjusted positions as determined by the plurality of passages 94 in the rearward end of each of the plates 74. A pair of locking pins 96 are passed through the passages 94 above and below the arm 84 to retain the arm in an adjusted angular position. The rearmost ends of the respective arms 84 are provided with fork-like clevis members 98 which support rollers 100 which are adapted to bear against the opposite lateral surfaces of a boat being loaded onto the trailer.

Instead of using rollers on the rearmost end of the guide arms 84, as shown in FIG. 1, the modified construction shown in FIG. 1(a) may be used in which the rear ends of the guide arms 84' are curved laterally outwardly, with the inner surfaces of the arms being faced with a suitable material 102 to prevent the guide arms from damaging the boat when the boat is moved between the arms preparatory to loading onto the boat trailer.

A hand rail 104 is rigidly secured to the rearward portion of one of the stationary arms 14 to aid in getting into or out of the boat.

In using the boat loader attachment of the invention, the attachment 10 may be mounted on the frame of substantially any type of boat trailer currently in use. The forward ends of the stationary arms are bolted by means of bolt 24 to a selected hole in the upright arm 22 at the forward end of the trailer frame, and the rear lateral support or back support sub-assembly 32 comprising the telescopic pipe members 34 and 36 is adjusted to the proper lateral width for the boat which is to be loaded on the trailer. The rearward ends of the stationary arms 14 are then adjusted to a predetermined desired height with respect to the slots 48 in the upright channel members 42 and are secured in the adjusted position by means of crank wrench 66–67, wing nuts or the like. When a boat is to be loaded onto the trailer, the movable guide arms 84 are then swung rearwardly about their pivotal supports 90 from the dotted line position to the full line position shown in FIG. 1 in which the guide arms guide the boat as it is being loaded onto the trailer.

After the boat has been completely loaded onto the trailer, the arms 84 may then be swung forwardly about their pivotal support 90 to the dotted line position shown in FIG. 1 in which the ends of the forwardly folded arms 84 are supported in the rests 28, the hinged cap members 30 then being closed so as to overlie the upper surface of the folded arms 84 to prevent their moving out of the rests 28.

It can be seen from the foregoing that there is provided in accordance with this invention a boat loading attachment which can be easily mounted on almost any type of boat trailer not already provided with guide arms, including tilting type trailers. The loader attachment includes guide arms which can be moved about a pivotal support to hold the boat straight in any depth of water or hard wind until the person loading the boat is ready to load it onto the trailer, making it possible for one person to load the boat without help, using only the winch to pull the boat onto the trailer, with the boat being guided by the guide arms of the loader attachment as it moves onto the trailer.

The boat loader attachment hereinbefore described may be built for a reasonable price and avoids the necessity of buying a new boat trailer with guides to replace an old trailer without guides since the old trailer may be provided with the boat loader attachment hereinbefore described.

While there has been shown and described a particular embodiment of the invention, it will be obvious to those skilled in the art that various changes and modifications may be made therein without departing from the invention and, therefore, it is aimed to cover all such changes and modifications as fall within the true spirit and scope of the invention.

What I claim as my invention is:

1. A boat loader attachment for a boat trailer, comprising a pair of laterally spaced stationary arms extending lengthwise of the boat trailer, means securing the forward ends of said arms to a forward portion of the trailer, a laterally extending normally horizontal support member adapted to be secured to the trailer body at a level lying beneath the boat when the boat is on the trailer, a separate upright member secured to each of the opposite lateral ends of said support member, means securing the rearward end of each stationary guide arm to one of said upright members in adjusted vertical position, an elongated movable guide arm pivotally secured to each stationary arm adjacent the normally rearward end of the respective stationary arm, each movable guide arm being pivotally movable about its pivotal connection to its corresponding stationary arm from an extended rearwardly directed position for use in guiding a boat being loaded, to a forwardly folded out-of-use retracted position.

2. A boat loader attachment for a boat trailer, as defined in claim 1, in which each stationary guide arm and the upright member to which it is secured are pivotally movable relative to each other.

3. A boat loader attachment for a boat trailer, as defined in claim 1, in which said laterally extending normally horizontal support member is pivotally movable relative to the trailer body.

4. A boat loader attachment for a boat trailer, comprising a pair of laterally spaced stationary arms extending lengthwise of the boat trailer, means securing the forward ends of said arms to a forward portion of the trailer, a laterally extending normally horizontal support member adapted to be secured to the trailer body at a level lying beneath the boat when the boat is on the trailer, said support member comprising a pair of telescopically engaged members movable with respect to each other to adjust the lateral width of said support member, a separate upright member secured to each of the opposite lateral ends of said support member, means securing the rearward end of each stationary guide arm to one of said upright members in adjusted vertical position, an elongated movable guide arm pivotally secured to each stationary arm adjacent the normally rearward end of the respective stationary arm, each movable guide arm being pivotally movable about its pivotal connection to its corresponding stationary arm from an extended rearwardly directed position for use in guiding a boat being loaded, to a forwardly folded out-of-use retracted position.

5. A boat loader attachment for a boat trailer, comprising a pair of laterally spaced stationary arms extending lengthwise of the boat trailer, means securing the forward ends of said arms to a forward portion of the trailer, a laterally extending normally horizontal support member adapted to be secured to the trailer body at a level lying beneath the boat when the boat is on the trailer, a separate upright member secured to each of the opposite lateral ends of said support member, each upright member having a vertical slot therein, an eye bolt having an eye portion and a stem extending from said eye portion, each stationary arm extending through the eye portion of a corresponding eye bolt, the stem portion of each eye bolt extending through the slot of the corresponding upright member and being secured in a given vertical position in said slot, an elongated movable guide arm pivotally secured to each stationary arm adjacent the normally rearward end of the respective stationary arm, each movable guide arm being pivotally movable about its pivotal connection to its corresponding stationary arm from an extended rearwardly directed position for use in guiding a boat being loaded, to a forwardly folded out-of-use retracted position.

6. A boat loader attachment for a boat trailer, comprising a pair of laterally spaced stationary arms extending lengthwise of the boat trailer, means securing the forward ends of said arms to a forward portion of the trailer, a laterally extending normally horizontal support member adapted to be secured to the trailer body at a level lying beneath the boat when the boat is on the trailer, a separate upright member secured to each of the opposite lateral ends of said support member, each upright member having a vertical slot therein, an eye bolt having an eye portion and a stem extending from said eye portion, each stationary arm extending through the eye portion of a corresponding eye bolt, each upright member having a flat web portion directed toward its corresponding stationary arm, a plate member having a flat surface abutting said flat web portion, said plate member having a concave surface engageable with said eye portion of said eye bolt, a passage extending laterally through said plate member, the stem portion of each eye bolt extending through the passage of its corresponding plate member and through the slot of the corresponding upright member and being secured in a given adjusted vertical position in said slot, an elongated movable guide arm pivotally secured to each stationary arm adjacent the normally rearward end of the respective stationary arm, each movable guide arm being pivotally movable about its pivotal connection to its corresponding stationary arm from an extended rearwardly directed position for use in guiding a boat being loaded, to a forwardly folded out-of-use retracted position.

7. A boat loader attachment for a boat trailer, comprising a pair of laterally spaced stationary arms extending lengthwise of the boat trailer, means securing the forward ends of said arms to a forward portion of the trailer, a laterally extending normally horizontal support member adapted to be secured to the trailer body at a level lying beneath the boat when the boat is on the trailer, a separate upright member secured to each of the opposite lateral ends of said support member, means securing the rearward end of each stationary guide arm to one of said upright members in adjusted vertical position, guide arm support plate means secured to the rearward end of each stationary arm, an elongated movable guide arm pivotally secured to each plate means, each movable guide arm being pivotally movable about its pivotal connection to its corresponding plate means from an extended rearwardly directed position for use in guiding a boat being loaded, to a forwardly folded out-of-use retracted position.

8. A boat loader attachment for a boat trailer, comprising a pair of laterally spaced stationary arms extending lengthwise of the boat trailer, means securing the forward ends of said arms to a forward portion of the trailer, a laterally extending normally horizontal support member adapted to be secured to the trailer body at a level lying beneath the boat when the boat is on the trailer, said support member comprising a pair of telescopically engaged members movable with respect to each other to adjust the lateral width of said support member, a separate upright member secured to each of the opposite lateral ends of said support member, means securing the rearward ends of each stationary guide arm to one of said upright members in adjusted vertical position thereon, guide arm support plate means secured to the rearward end of each stationary arm, an elongated movable guide arm pivotally secured to each plate means, each movable guide arm being pivotally movable about its pivotal connection to said plate means from an extended rearwardly directed position for use in guiding a boat being loaded, to a forwardly folded out-of-use retracted position.

9. A boat loader attachment for a boat trailer, comprising a pair of laterally spaced stationary arms extending lengthwise of the boat trailer, means securing the forward ends of said arms to a forward portion of the trailer, a laterally extending normally horizontal support member adapted to be secured to the trailer body at a level lying beneath the boat when the boat is on the trailer, said support member comprising a pair of telescopically engaged members movable with respect to each other to adjust the lateral width of said support member, a separate upright member secured to each of the opposite lateral ends of said support member, each upright member having a vertical slot therein, an eye bolt having an eye portion and a stem extending from said eye portion, each stationary arm extending through the eye portion of a corresponding eye bolt, each upright member having a flat web portion directed toward its corresponding stationary arm, a plate member having a flat surface abutting said flat web portion, said plate member having a concave surface engageable with said eye portion of said eye bolt, a passage extending laterally through said plate member, the stem portion of each eye bolt extending through the passage of its corresponding plate member and through the slot of the corresponding upright member and being secured in a given adjusted vertical position in said slot, guide arm support plate means secured to the rearward end of each stationary arm, an elongated movable guide arm pivotally secured to each guide arm support plate means, each movable guide arm being pivotally movable about its pivotal connection to said guide arm support plate means from an extended rearwardly directed position for use in guiding a boat being loaded, to a forwardly folded out-of-use retracted position.

10. In combination, a boat trailer, a boat loader attachment adapted to be mounted on said boat trailer, said boat loader attachment comprising a pair of laterally spaced stationary arms extending lengthwise of the boat trailer, means securing the forward ends of said arms to a forward portion of the trailer, a laterally extending normally horizontal support member adapted to be secured to the trailer body at a level lying beneath the boat when the boat is on the trailer, a separate upright member secured to each of the opposite lateral ends of said support member, means securing the rearward end of each stationary guide arm to one of said upright members in adjusted vertical position, an elongated movable guide arm pivotally secured to each stationary arm adjacent the normally rearward end of the respective stationary arm, each movable guide arm being pivotally movable about its pivotal connection to its corresponding stationary arm from an extended rearwardly directed position for use in guiding a boat being loaded, to a forwardly folded out-of-use retracted position.

References Cited by the Examiner
UNITED STATES PATENTS

| | | | |
|---|---|---|---|
| 3,021,969 | 2/62 | Peake et al. | 214—505 X |
| 3,031,093 | 4/62 | Holsclaw | 214—505 |
| 3,056,517 | 10/62 | Trumbull | 214—505 X |

HUGO O. SCHULZ, *Primary Examiner.*